(No Model.)  3 Sheets—Sheet 1.
J. E. ELLIOTT.
TRANSPLANTING TRUCK.
No. 580,640. Patented Apr. 13, 1897.
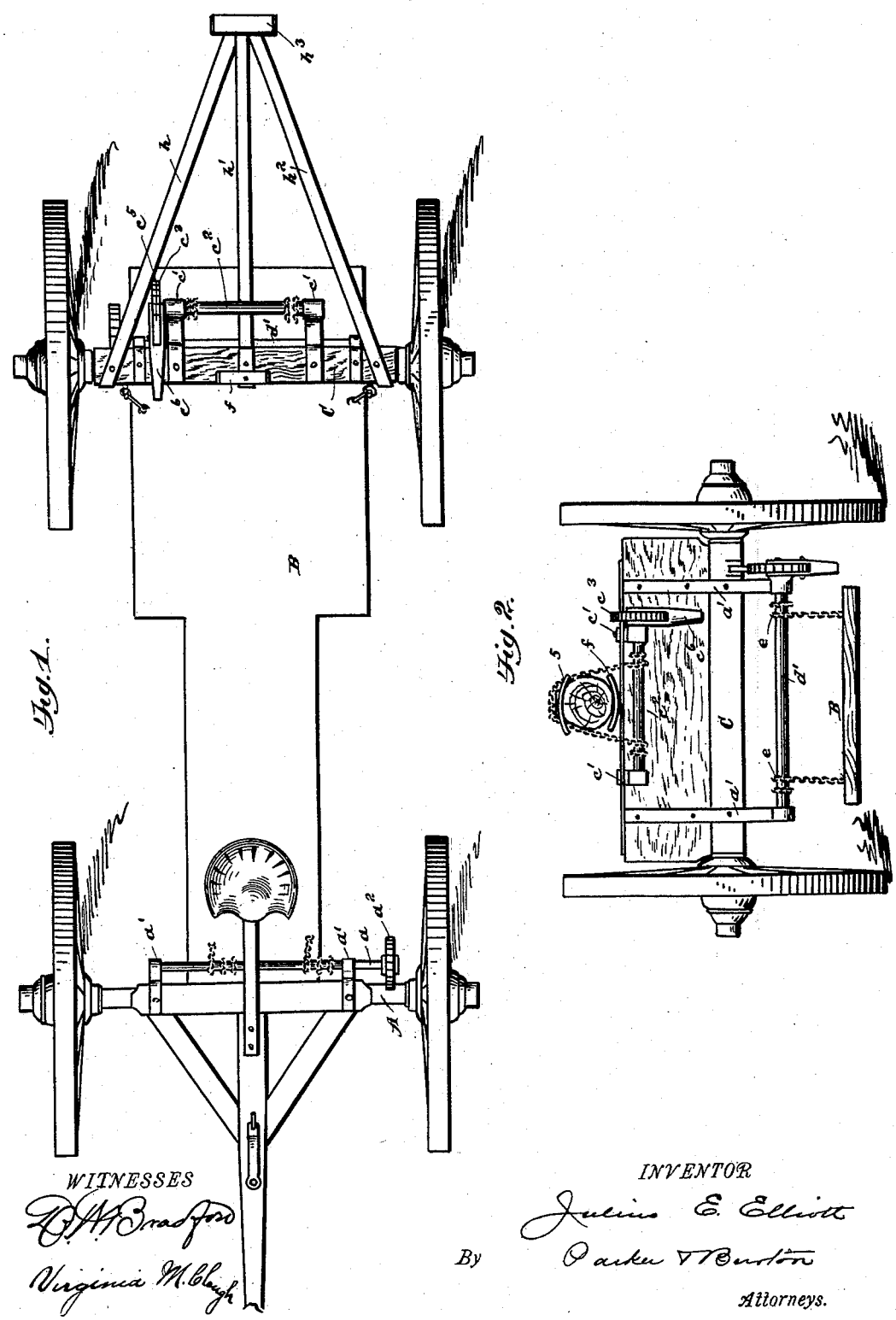
WITNESSES
D. H. Bradford
Virginia M. Clough
INVENTOR
Julius E. Elliott
By Parker V. Burton
Attorneys.

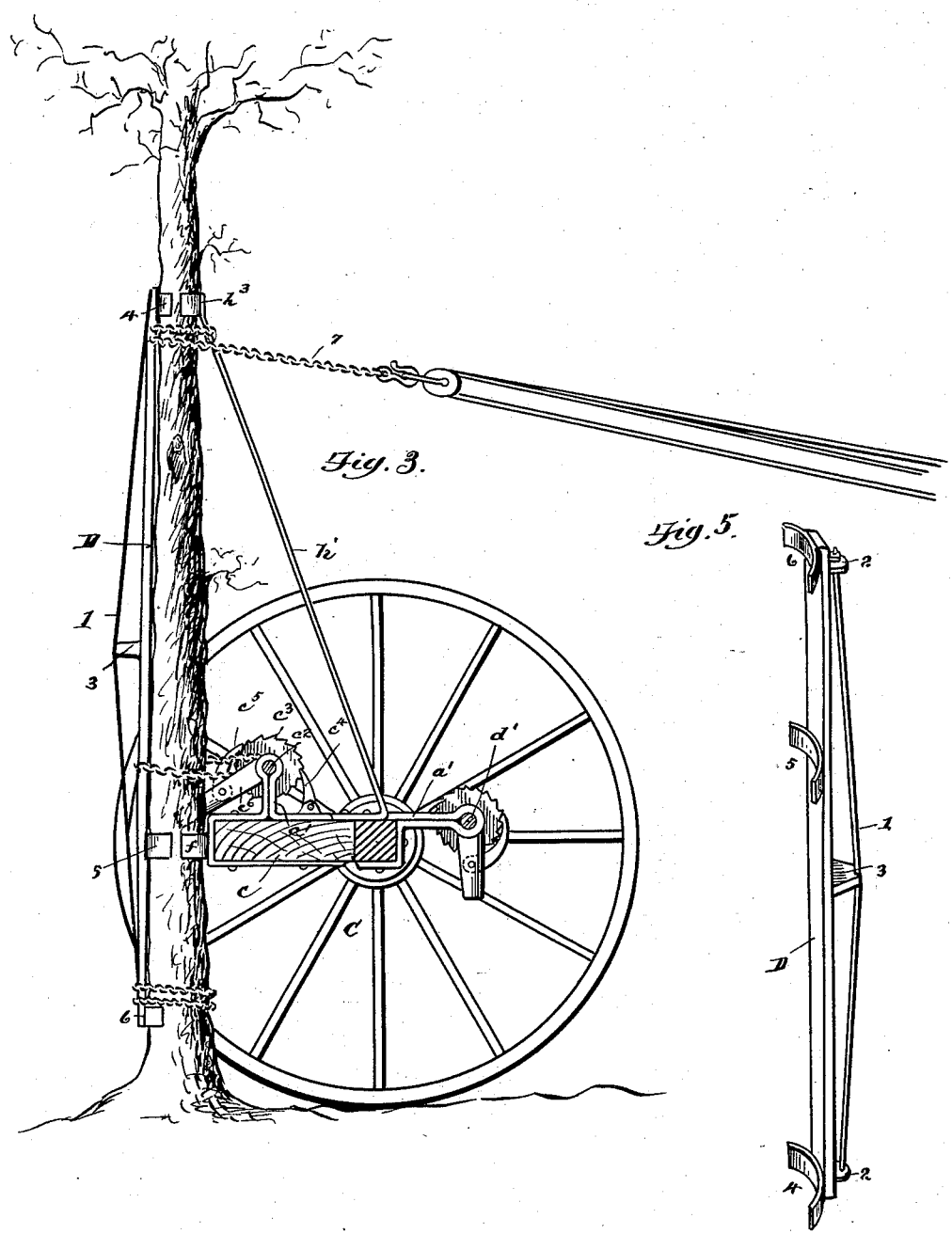

(No Model.) 3 Sheets—Sheet 3.
J. E. ELLIOTT.
TRANSPLANTING TRUCK.
No. 580,640. Patented Apr. 13, 1897.
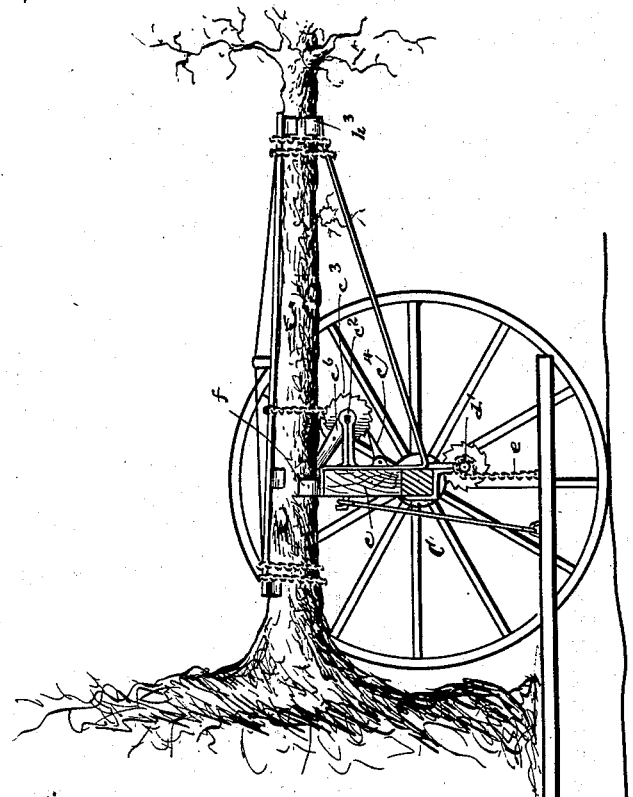
Fig. 4.
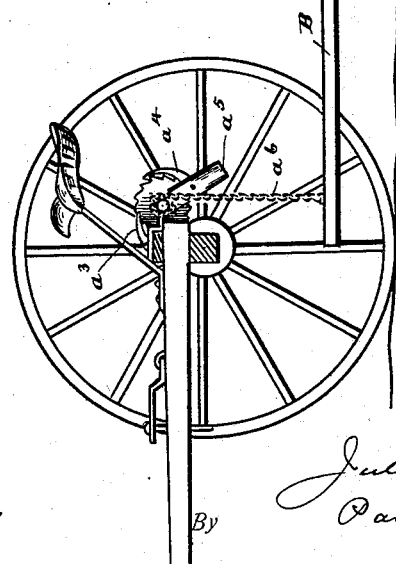
WITNESSES
B. H. Bradford
Virginia M. Clough.
INVENTOR
Julius E. Elliott
By Parker & Burton
Attorneys.

UNITED STATES PATENT OFFICE.

JULIUS E. ELLIOTT, OF SOUTH ROCKWOOD, MICHIGAN.

TRANSPLANTING-TRUCK.

SPECIFICATION forming part of Letters Patent No. 580,640, dated April 13, 1897.

Application filed February 15, 1897. Serial No. 623,519. (No model.)

*To all whom it may concern:*

Be it known that I, JULIUS E. ELLIOTT, a citizen of the United States, residing at South Rockwood, county of Monroe, State of Michigan, have invented a certain new and useful Improvement in Transplanting-Trucks; and I declare the following to be a full, clear, and exact description of the invention, such as will enable others skilled in the art to which it pertains to make and use the same, reference being had to the accompanying drawings, which form a part of this specification.

This invention relates to a transporting-truck, and has for its object improvements in that class of trucks which are particularly adapted to be used for the purpose of lifting trees from one position, transposing them to another position, and depositing them in an upright position in a second place.

It is frequently found desirable to remove trees of considerable size from one place and plant them in another place, and in order that this may be done without injury to the tree special devices must be employed that will lift the tree without bending it.

In the drawings, Figure 1 is a plan view of the complete truck. Fig. 2 is a view of the rear truck as seen from behind. The location of the body of the loaded tree is indicated. Fig. 3 is a sectional elevation showing the rear truck attached to a tree in a position ready to lift it. Some of the braces are omitted from this figure. Fig. 4 is a longitudinal sectional elevation showing the tree loaded on the truck. Fig. 5 is a perspective showing the trussed back-bar used in lifting and loading the tree. The trussed back-bar is made to be as rigid as possible in order that it may sustain the maximum amount of the strain in lifting the tree from its original position and turning it onto its side.

A indicates the front axle and wheels of the truck, to which the ordinary draft-tongue is attached and to which there is also attached a shaft $a$, journaled in brackets $a'$ and provided with a ratchet-wheel $a^2$, with which there engages a holding-pawl $a^3$ and the actuating-pawl $a^4$. The actuating-pawl $a^4$ is hinged or held by a pin to a lever $a^5$, one end of which is held on the shaft $a$ and the other end of which is tubular in form and adapted to receive the end of the bar in order that its lever length may be added to it.

The shaft is rotated by means of the actuating-pawl $a^4$ and lever $a^5$ and serves to wind up the chain $a^6$ and lift the forward end of the table B.

On the axle of the rear truck C is a wide bolster $c$, on the upper side of which are attached two brackets $c'$ $c'$, that form the supports for the shaft $c^2$. On the shaft $c^2$ is a ratchet-wheel $c^3$, and this is held by a holding-pawl $c^4$ and actuated by a pawl $c^5$ and lever $c^6$, adapted to be actuated in the same way as the lever attached to the forward wheels of the truck.

To the bottom of the axle or bolster are attached brackets $a'$, that support a shaft $d'$ with a ratchet-wheel and pawls of the same character. This latter shaft serves as a winding-drum for the chains $e$ $e$ that lift and support the rear end of the table B.

The upper side of the bolster $c$ is provided with a saddle $f$, which forms a rest for the body of the tree, and there are also, extending backward from it, three braces $h$ $h'$ $h^2$, which form a support for a second saddle that is in a plane with the saddle $f$, the two saddles being so disposed with reference to each other and to the bolster that they are substantially in a horizontal plane when the bolster is vertically disposed above the axle and in a vertical plane when the bolster is turned to the rear of the axle to engage an upright tree preparatory to lifting it, as shown in Fig. 3.

Fig. 5 indicates an auxiliary brace or bar, of which the main or body part D is made as rigid as possible by means of a truss-rod 1, that engages proper fittings 2 at the ends and passes over a king-post 3. On the front of the bar D are three saddles 4, 5, and 6, one of which is intended to be placed against the body of the tree near the roots, the middle one of which is intended to be placed against the body of the tree opposite the saddle $f$, and the third of which is intended to be placed against the body of the tree opposite the saddle $h^3$.

The entire bar D is secured to the stem of the tree by chains or cables and is held to the rear wheels of the truck, with the bolster $c$ turned down to a horizontal position or backed up against the stem of the tree on the side opposite to which the bar D is secured, and the bar is then made fast to the bolster with the stem of the tree interposed between it and the bolster.

The fastening is effectuated by means of a chain or cable that passes around the bar and the stem of the tree and is adapted to be wound on the shaft $c^2$. The body of the tree is now in an upright position between the saddles 5 and $f$ and the saddles 4 and $h^3$. The line is passed around the upper end of the bar D and around the braces which hold the saddle $h^3$, and draft appliances are made fast to this, as in indicated in Fig. 3, where the short chain 7 is shown as passed around the bar and the braces, and the block and tackle is shown as engaged with a hook at the end of the chain. The entire device is now tipped in the direction of the tackle, and this lifts the tree from its bed, turns it to a horizontal position, where it rests in the saddles $f$ and $h^3$, and this lifting and turning has been done without any strain on the tree itself. The table B is next drawn under the roots of the tree, the rear end of the table lifted by means of the shaft $d'$, and the chains wound on it, the forward end of the table lifted and secured to the forward axle, and the tree is ready for transportation.

An important feature of this invention is found in the use of the removable or detached trussed bar D, which can be used in connection with the saddle on the bolster, and the saddle supported by the braces with trees of any size and with trees that may be slightly crooked, and the supported saddles and detachable bar form a structure, when the tree is engaged between them and properly lashed to them, that is so rigid that it does not spring or bend the tree in the least, thereby overcoming a difficulty that has been found to exist in many transporting devices—i. e., that the device springs and bends the tree somewhat, splitting it and causing an injury that is in the first instance so slight as to be scarcely noticeable, but which develops in the course of a few months into a serious injury to the tree.

What I claim is—

1. In a transplanting device in combination with the truck-wheels provided with a high bolster and with a saddle on said bolster and a second saddle supported at a distance therefrom, a detachable bar adapted to engage the body of the tree between itself and said saddles, substantially as described.

2. In a device for transplanting trees the combination of a wheeled axle provided with a bolster, with a saddle on said bolster and a second saddle supported on braces attached to said bolster, a trussed bar adapted to engage the body of a tree between itself and said saddles, substantially as described.

3. In a device for transplanting trees in combination with a wheeled axle provided with a bolster and with a saddle on said bolster, and a second saddle supported on braces attached to said bolster, a trussed bar provided with saddles and adapted to engage the body of the tree between the saddles on the bar and the saddles on the bolster and braces, substantially as described.

4. In a device for transplanting trees in combination with a wheeled truck provided with a bolster and a saddle thereon, and a second saddle supported on braces attached thereto, a shaft and means for rotating same adapted to be used to draw a binder tightly around the body of the tree, substantially as described.

In testimony whereof I sign this specification in the presence of two witnesses.

JULIUS E. ELLIOTT.

Witnesses:
JOHN ELLIOTT,
VIRGINIA M. CLOUGH.